Jan. 31, 1956    J. VAN ACKEREN    2,733,054
SPRAY TYPE GAS AND LIQUID SCRUBBER
Filed June 13, 1952    4 Sheets-Sheet 1

GAS →
LIQUID ↦

INVENTOR.
JOSEPH VAN ACKEREN.
BY
Thomas J. P. O'Brien
his
ATTORNEY.

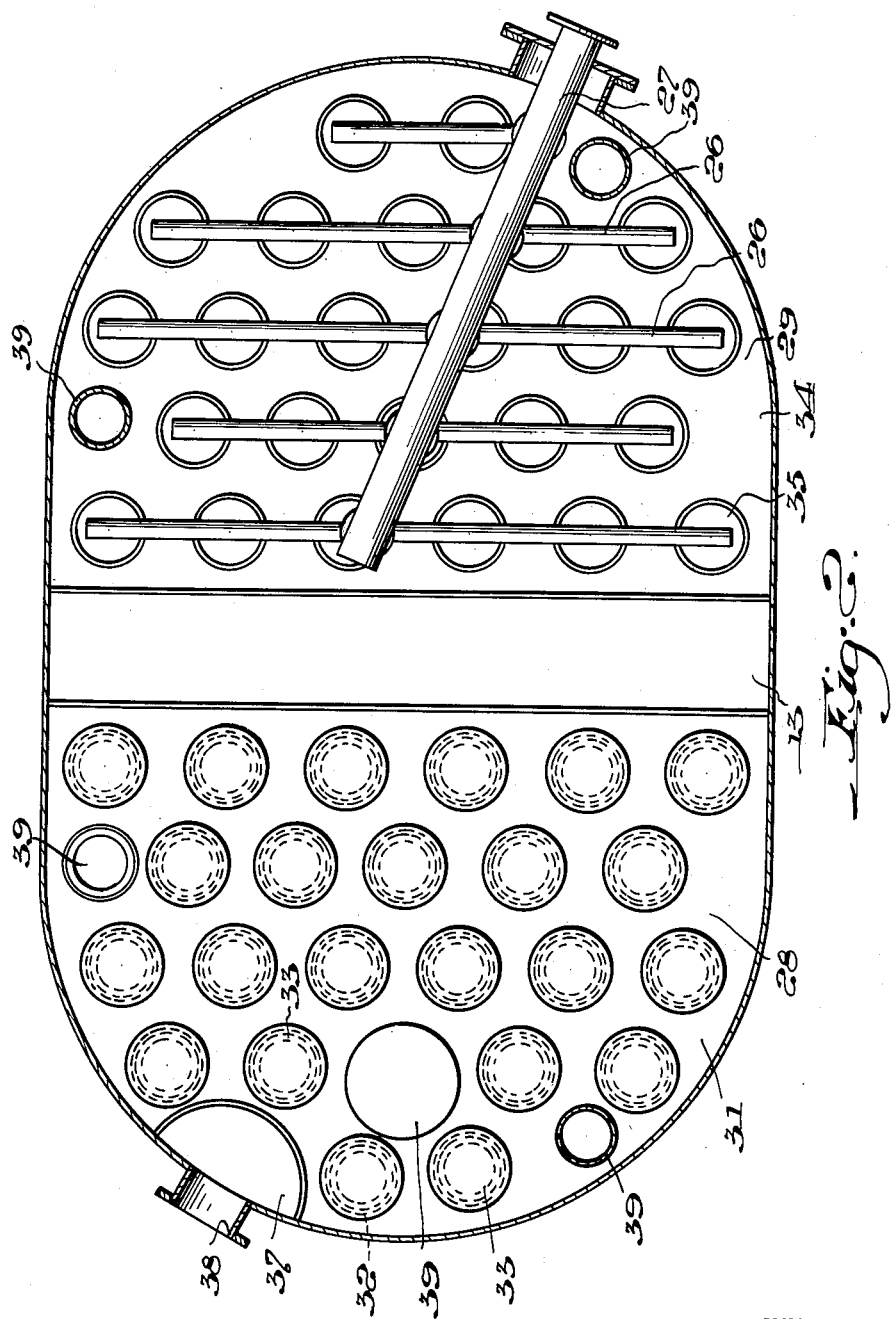

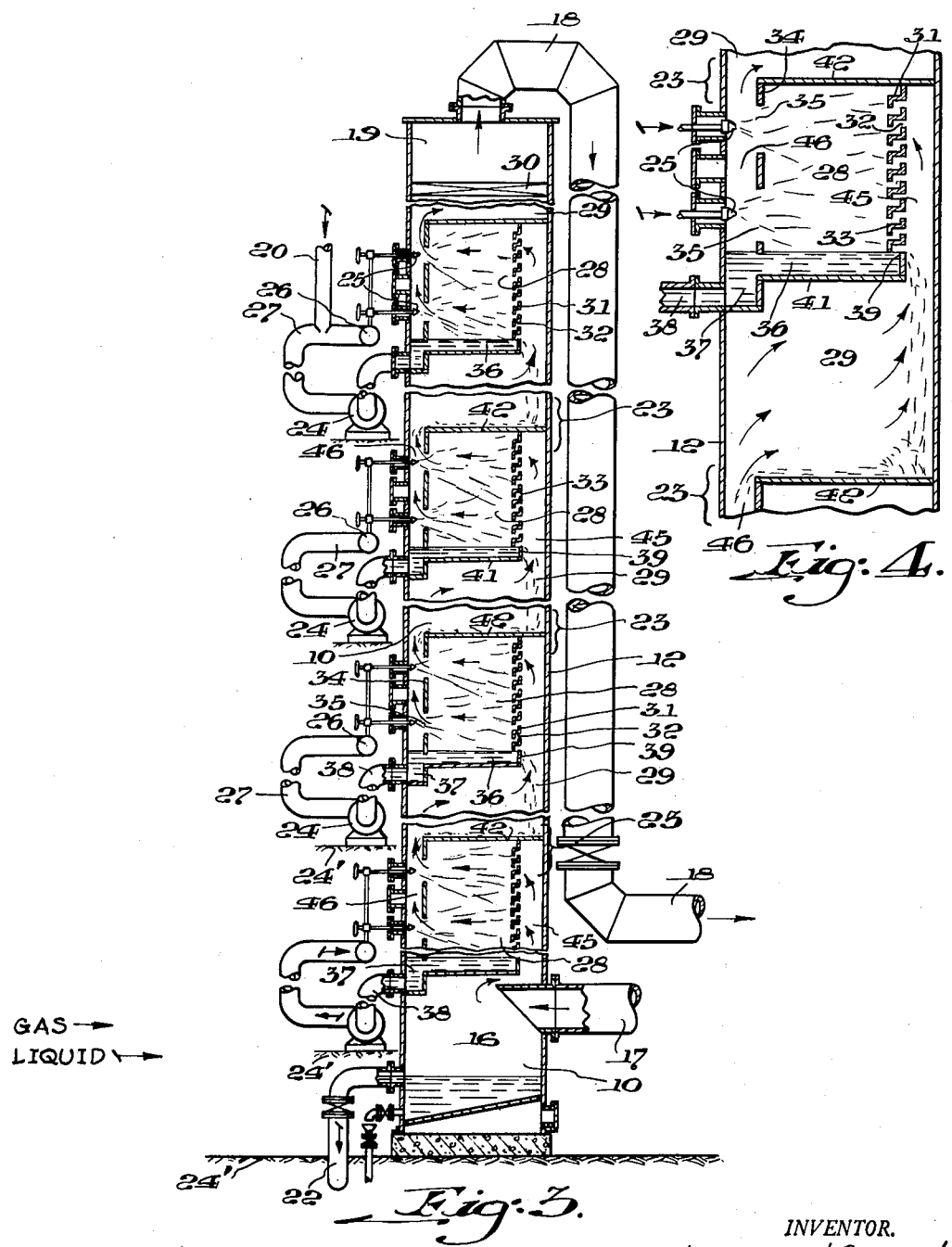

INVENTOR.
JOSEPH VAN ACKEREN.

United States Patent Office 2,733,054
Patented Jan. 31, 1956

2,733,054

SPRAY TYPE GAS AND LIQUID SCRUBBER

Joseph Van Ackeren, Pittsburgh, Pa., assignor to Koppers Company, Inc., a corporation of Delaware Application June 13, 1952, Serial No. 293,251

8 Claims. (Cl. 261—21)

The present invention relates in general to apparatus for intimate contact of gas with the liquid in the form of a spray, to remove constituents of the gas by the liquid or to remove constituents of the liquid by means of the gas.

More particularly the invention is directed to improvements in spray type scrubbers or washers of the kind in which the gas and liquid are repeatedly brought into contact with each other in stages, with counterflow of gas and liquid in the form of fine spray in each stage, and countercurrent flow of gas and liquid from stage to stage, to approach equilibrium conditions in each stage between the gas and liquid with respect to the constituent to be removed.

With the apparatus of the present invention, the gas is first washed or scrubbed in each stage by the countercurrent flow of the liquid in the form of a fine spray under pressure from nozzles and thereafter is subjected to de-entrainment or disengagement in each stage, in a manner to eliminate the use of packed towers or bubble cap trays for attaining effective contact of the gas and liquid, and thereby makes possible the processing of the gas or liquid to be treated with a low and uniform pressure drop and freedom from plugging of packing in the scrubber or washer.

In such scrubbers or washers, the processing of the gas or liquid may involve a single pass of the liquid in the form of a spray through the respective stages, or repeated passes of the liquid in the form of fine spray through the respective stages by collecting the sprayed liquid in each stage and conveying the same back to the spray heads for the individual stages until the liquid approaches equilibrium with the gas in the respective stages.

To attain the essential equilibrium conditions with this type of scrubber with the advantages over conventional scrubbers or washers of the bubble cap tray and packed column type, of a low pressure drop and freedom from the possibility of plugging of packing, such spray type washers should provide adequate contact of all of the gas with all of the spray in each stage, with no chance for part of the gas or the liquid of the spray to short circuit through the washer or scrubber without being thoroughly mixed in each stage.

Carry over of liquid with the gas from stage to stage in the wrong direction must be kept to a minimum. Pressure drop of the gas, in passing through the washer must be kept low. The quantity of liquid recirculated over each stage must be kept reasonably low. Theoretically, each stage would represent one equilibrium stage if the efficiency of contact were 100%. By recirculating large quantities of liquid over each stage, an equilibrium efficiency approaching 100% might be reached. In practice a compromise must be taken between the lower efficiency obtained with lower recirculating rates and the higher costs incurred at higher recirculating rates.

The passage of gas at high velocity countercurrently through a spray of liquid where the liquid is closest to the spray head and is in the form of closely spaced fine globules, before the spray globules coalesce, is the most effective and efficient manner of effecting intimate contact of the gas and liquid.

However, the conditions of the spray at this region of the spray head which lend themselves most effectively for contact of the liquid and gas, that is, fineness and closeness of globules, also are the most favorable conditions for carry over of spray with the gas under countercurrent flow conditions, especially under high gas velocities.

In the prior art when it was sought to take advantage of the greater intensity of the spray in its most concentrated forms for intimacy of contact by forcing all of the gas to pass through the same in countercurrent in each contact stage, by causing the gas to converge towards spaced gas outlets from a spray chamber having spray heads set therein to release the spray into the spray chamber at the inner region of the outlets before the gas could pass out to a spray de-entrainment chamber, much of the advantage was lost since the gas is at its highest velocity in passing through the outlets and at that time is not in contact with the spray from the nozzles, but instead flows through the unsprayed space around the portion of the spray heads in the gas outlets, and the de-entrainment was carried out at a gas velocity much higher than the velocity of the gas in the spray chamber before its acceleration in velocity in passing through the restricted outlets, with the result that much of the liquid constituents remained in the gas leaving the scrubbing apparatus, even though reliance was placed on centrifugal force to throw entrained liquid out of the gas stream during its flow at high velocity through the de-entrainment spaces.

To overcome this, it has been proposed to have the gas leave the spray chamber through unobstructed gas spaces around the cones of liquid from the jets before undergoing centrifuging in separate gas de-entrainment chambers leading to a next spray chamber, so that the gas, after passing through the wider divergent portions of the spray cones, then passes around, instead of through, the finer more concentrated portion of the spray cones closest to the jets, and thereby deposit any droplets of liquid entrained by the gas. While this may prevent carry over of spray by the gas, it results in inefficient scrubbing of the gas by the spray, since it fails to utilize the most effective portion of the spray cones for intimate contact of gas, and may also result in insufficient absorption of constituents from the gas or liquid.

An object of the invention is to provide for the more efficient scrubbing of gas with liquid in stages as aforesaid in a manner to employ the more effective and efficient action of the portion of the spray cones where the liquid is closest to the spray heads together with de-entrainment in a manner in which there is substantially no carry over by the gas from stage to stage of liquid from the sprays.

A further object of the invention is to effect the stage treatment of the gas and liquid in each stage by means of sprays in an unpacked spray chamber followed by de-entrainment of spray in an unpacked de-entrainment chamber in which the liquid is sprayed into the spray chamber by spray heads set beyond gas outlet ports from the spray chamber so as to cover said ports with the spray as it enters the spray chamber, whereby all the gas on leaving the spray chamber is constrained to pass at its highest velocity through the narrower portion of the spray flowing in through the gas outlet ports before the gas enters the de-entrainment chamber.

A further object of the invention is to effect the stage treatment of the gas in each stage by means of sprays in an unpacked spray chamber with liquid which is discharged as spray adjacent gas outlet ports for the spray chamber and through which discharge region all the gas is constrained to pass in order to leave the spray chamber, followed by de-entrainment of the liquid from the gas in a separate chamber at a gas velocity as low as or lower than that which obtains in the spray chamber before the gas passes through the outlet ports.

A further object of the invention is the provision for the treatment of gas and liquid in stages in each of which all of the gas leaving a spray chamber is forced to pass through orifices through which the liquid is being sprayed countercurrently to the flow of gas by spray heads set beyond the orifices to cover them with the spray, and then is passed through a de-entrainment chamber of substantially the same low, or a lower, flow velocity than, and of the same large, or larger, volumetric capacity as the spray chamber, whereby the gas is gravitationally de-entrained at a velocity lower than the velocities at which it entrains liquid in passing through the orifices.

More specifically, the invention contemplates the carrying out of the foregoing objects by distributing the gas at a high velocity through passages spaced over the entire area of the spray chambers, as the gas enters the same, then flowing the gas at relatively low velocity through overlapping cones of spray in a spray chamber, and discharging the gas at its highest velocity from the spray chamber through the more intense portion of the spray of the cones flowing from spray heads through restricted orifices before the gas enters the spray de-entrainment chamber.

In addition, further important features of the invention reside in: the employment in each stage of a spray chamber of constant cross-sectional area from its gas inlet passages to its gas outlet orifices and a de-entrainment chamber of substantially constant cross-sectional area and of at least the same effective volumetric flow capacity and cross-sectional area as its spray chamber; the carrying out of the foregoing apparatus features in a vertical tower in which, the stages are arranged one above the other for countercurrent flow of gas and liquid in a vertical direction and vertical flow in each of the respective chambers, said chambers being separated from each other by horizontal partitions forming the bottom and top of adjacent chambers, and having the inlet and outlet passages and orifices disposed throughout the lower and upper partitions that form the bottoms and tops of the vertical flow spray chamber, and the spray heads and the headers therefor being located within the de-entrainment chambers and disposed with nozzles of the spray heads set to discharge the liquid in the form of a spray into the spray chamber below through the outlet orifices in the partition immediately below the de-entrainment chambers in such manner as to cover the outlet orifices with the sprays of liquid as the gas flows through the same countercurrently; the carrying out of the foregoing apparatus features in a vertical tower with the stages arranged one above the other with countercurrent flow of gas and liquid from top to bottom but in a zigzag manner alternately in opposite direction in adjacent chambers, with the gas flow horizontally in the same direction in all of the spray chambers from one side of a diameter of the tower to the opposite side of the diameter of the tower, and the flow through all of the de-entrainment chambers in the same direction as each other but in direction opposite to the direction of flow in the spray chambers, the partitions with inlet distributing passages being vertically disposed alongside the spray chambers in spaced relation with the tower shell forming riser inlet conduits connecting with a de-entrainment chamber below, and the partitions without outlet orifices likewise being vertically disposed alongside the spray chambers in spaced relation with the shell diametrically opposite the inlet partitions and forming riser outlet conduits connecting with a spray de-entrainment chamber above.

With the zigzag arrangement the spray heads are located in the riser outlet conduits and disposed with their nozzles set to discharge the liquid horizontally into the spray chambers in the form of a fine spray through the outlet orifices so as to cover said outlets with the more intensive part of the liquid spray as the gas flows out at its highest velocity through the outlet orifices countercurrent to the spray. The spray heads are connected to distributing headers outside the tower at the different levels of the spray chambers and the inlet passages to the spray chambers are provided with liquid deflectors which prevent liquid from passing through the gas inlet passages.

Advantages of such features are that the gas and liquid contact, and the de-entrainment, is most effective and efficient when the velocity of flow is constant from inlet to outlet. The arrangement of the chambers for vertical flow with the inlet passages and outlet orifices in horizontal partitions is more economical and simpler to construct than when the chambers are arranged for horizontal zigzag flow with the inlet passages and outlet orifices in vertical partitions alongside the shell. However, the zigzag arrangement has the advantage over the vertical flow arrangement of greater ease in accessibility to the spray headers and their nozzles for cleaning, repair, and replacement or adjustment since they are readily accessible from alongside the outside of the shell whereas with the former it is necessary to enter into the spray de-entrainment chambers for such purposes.

In both arrangements, the spray nozzles are arranged in such spaced relation to each other that the conical sprays overlap each other in the spray chambers and hence all the gas must pass progressively through the most divergent portion of the spray towards the narrowest and more intense portion of the sprays in passing through the spray chambers.

With the apparatus described, all the gas enters each spray chamber at a high velocity in passing through the inlet passages, flows at a relatively low velocity countercurrently to cone sprays in the spray chambers and then flows out of the spray chambers at its higher velocity through the freshest portion of the spray in its most intense form in the outlet orifices, whereupon the spray velocity decreases in each de-entrainment chamber to a rate below its rate of acceleration on leaving the spray chambers at highest velocity in contact with the most intense portion of the cone of the sprays. As a consequence all of the gas is brought into contact with the densest portion of the spray at a condition most favorable for contact and is then reduced in velocity to a rate at which spray entrained at such high velocity loses the velocity required to suspend it in the gas current before the gas reaches a next stage.

Preferably the spray is collected in each spray chamber and recirculated again over the same spray chamber at twice or several times the rate at which fresh liquid is introduced to the topmost stage, and a mist eliminator is placed above the topmost spray stage, and the excess liquid in each stage is conveyed to a next lower stage in the series, the liquid from each spray chamber either overflowing into the next lower de-entrainment chamber and then being passed together with de-entrained liquid into mixture with liquid collecting in the lower spray chamber for respraying in that stage, or else passing directly to liquid collecting in the next lower spray chamber, for respraying therein, along with de-entrained liquid overflowing thereto from the de-entrainment chamber above.

Other objects and advantages of the invention will be apparent from the following description of two embodiments of the apparatus.

The apparatus of the present invention is particularly adapted for scrubbing benzol from coke oven gas as one of a series of steps usually employed in coke oven by-product or chemical recovery plants for processing coke oven gas as it leaves the coke oven batteries in which the gas is distilled off in coking coal to produce metallurgical coke for blast furnaces, for foundry coke, and the like, as well as coke for domestic consumption.

However, the apparatus of both embodiments is not limited solely to such application, but is equally applicable to scrubbing of such coal or coke oven gas in the same chemical recovery product train of apparatus, as ammonia washers for absorbing ammonia, as absorbers for removing hydrogen sulfide, hydrogen cyanide and similar chemical impurities, from the coke oven gas or other process gas, and as primary coolers for cooling and condensing water vapor from the coke oven gas or other process gas, and as final coolers for cooling and condensing water vapors from coke oven gas or similar process gas in the coke oven by-product chemical recovery train of apparatus before treatment for absorption of its light oil content, as in the benzol scrubbing step and apparatus.

Though not limited thereto, the apparatus is also especially suitable to and adapted for removal of tar and naphthalene, from the coke oven gas and other process gas.

The novel features of the present invention are not limited, in all its aspects, to processing such coke oven gas, since they are especially suitable also for stripping liquid by means of gas, such as, for instance, phenol removal towers for stripping phenol from ammonia liquor or other similar plant wastes, as occur in such chemical recovery coke oven by-product plants.

The novel features of the invention are also especially suitable as coolers for reformed natural gas, water gas, oil gas, etc., for cooling and removing water vapor from these gases, as well as coolers and scrubbers for producer gas to cool the gas and remove dust carried over from the producers.

Hence, the novel features of invention, are not confined to the specific use, and specific embodiment of scrubbing benzol from coke oven gas, hereinafter set forth as an illustrative example.

In the accompanying drawings forming a part of this specification and showing for purposes of exemplification, two preferred embodiments of the invention, but without limiting the claimed invention, in all its aspects, to these embodiments:

Figure 2 is a horizontal cross-sectional view taken on the line 2—2 of Figure 1;

Figure 3 is a vertical cross-sectional view of a scrubbing tower illustrating a next preferred form of embodying and practicing the present invention.

Figure 4 is an enlarged view of a portion of Figure 3 illustrating one of the stages comprising the uppermost spray chamber and the spray de-entrainment chamber therebeneath, the view illustrating the relationship between the spray chamber and the de-entrainment chamber of each stage.

Figure 1:
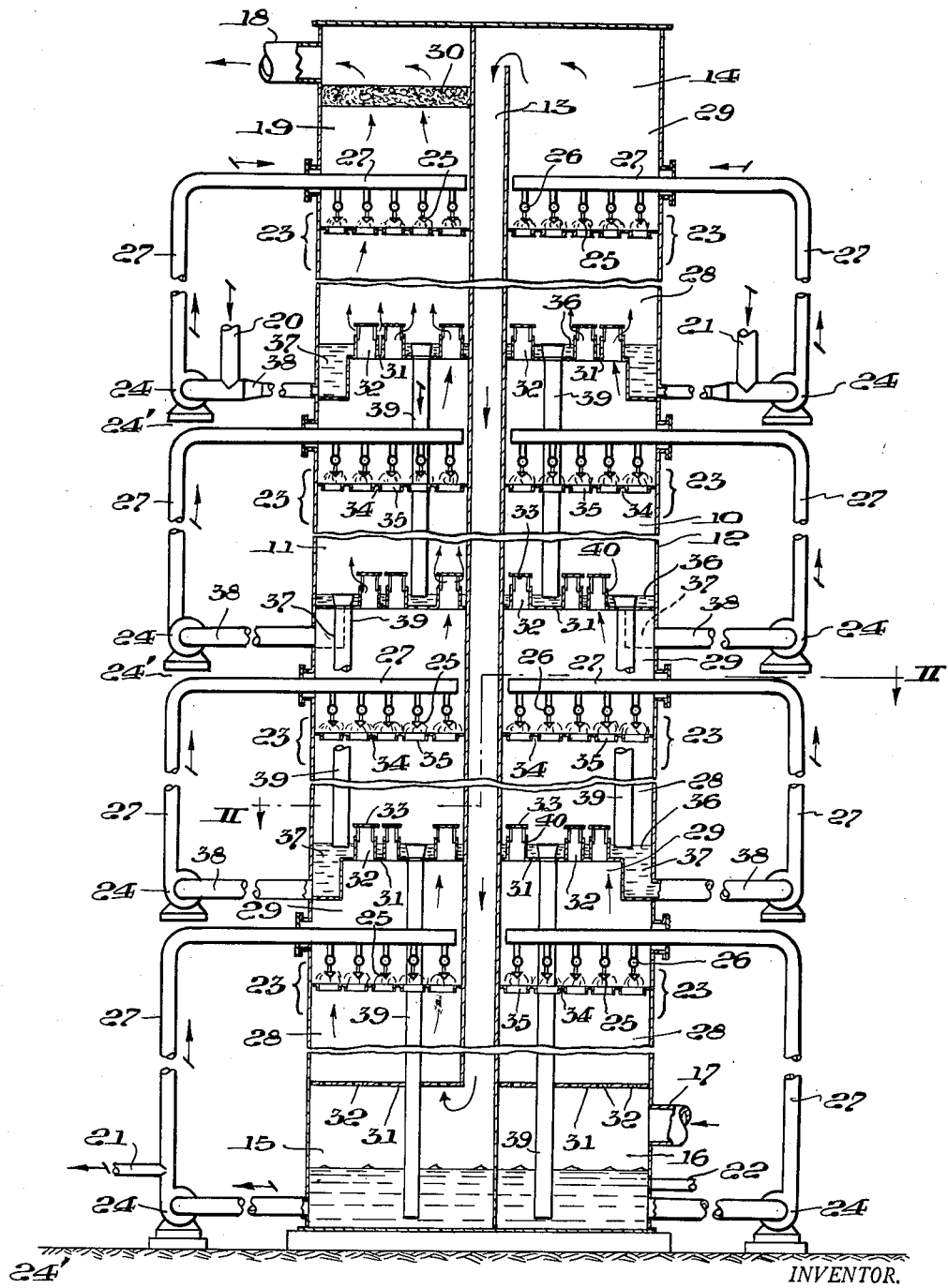
Figure 1 is a vertical cross-sectional view of a scrubbing tower illustrating the preferred form of embodying and practicing the present invention.
Figure 5:
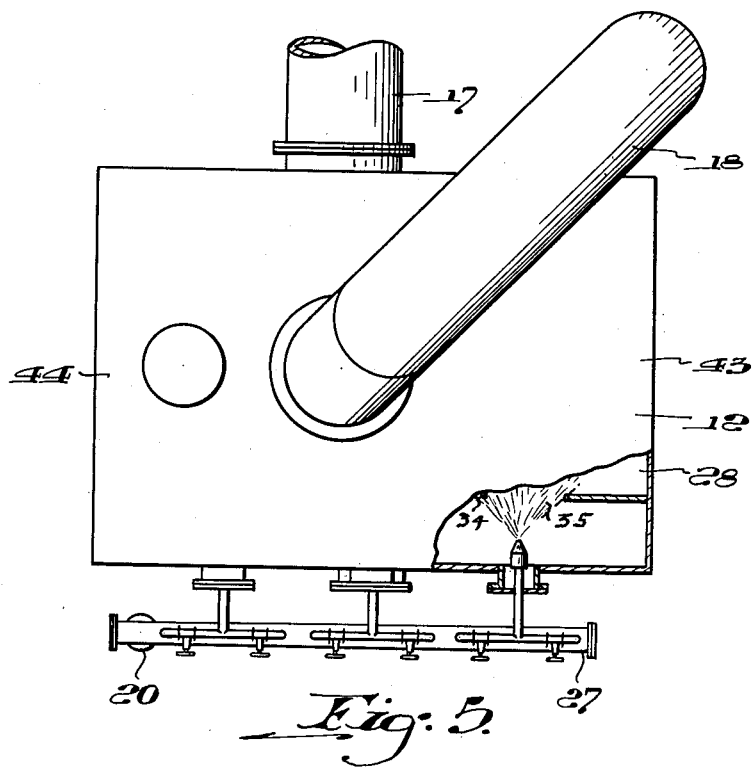
Figure 5 is a top plan view of the scrubber shown in Figure 3.
Figure 6:
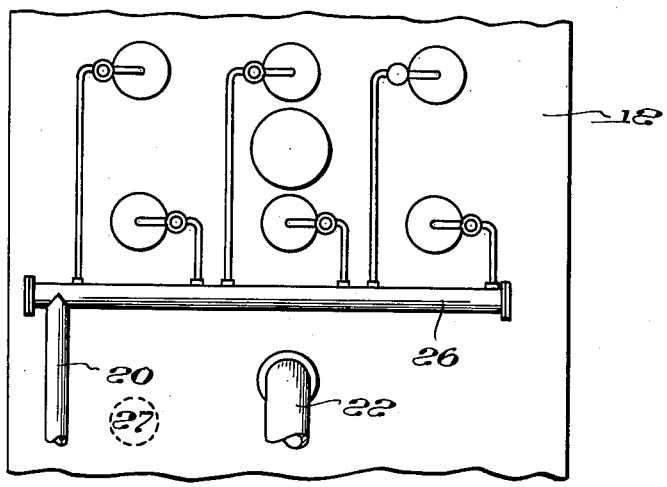
Figure 6 is an elevational view of the lowermost portion of the scrubber shown in Figure 3.

Referring to Figs. 1 and 2, the scrubber there shown is of an existing two-pass type reconstructed to incorporate the features of the present invention, although in most cases scrubbers of the invention are cylindrical in form with a single pass in each shell.

The converted existing washer or scrubber as shown in Figs. 1 and 2 comprises two semi-circular gas passes 10, 11, in a single elliptical shell 12 having a central vertical conduit 13 connecting the top 14 of pass 10 with the bottom 15 of pass 11, for flow of gas from the top of the first pass 10 to the bottom of the second pass 11.

Benzol laden gas to be debenzolized or scrubbed to strip it of its benzol content is admitted to the lowermost portion 16 of the first pass 10 in the scrubber or tower 12, by means of lower gas inlet 17, and after flowing upwardly through pass 10, the gas thence flows downwardly through the central conduit 13 and upwardly through the pass 11 to finally pass out through the upper gas outlet 18 substantially free of the content of benzol to be removed from the gas by means of an absorbent liquid for benzol, such as straw oil.

The liquid absorbent oil is first introduced by means of line 20 into contact with the gas as fresh debenzolized absorbent liquid at the top 19 of the pass 11 whence it is made to flow countercurrently to the flow of the gas, in a generally downwardly direction through the pass 11 and, by means of line 21, thence into the top 14 of the pass 10, wherein it flows in a generally downward direction until it reaches the bottom 16 of the pass 10, enriched in benzol absorbed from the gas.

The benzol-enriched absorbent leaves the scrubber 12 through a liquid outlet 22 at the bottom 16 below the gas inlet 17 where the gas first enters the scrubber.

For absorbing the benzol, or light oil from the gas such as coke oven gas with intimate contact of the gas and liquid during their flow countercurrently through the passes 10, 11, by means of fine sprays of liquid, in the absence of packing as heretofore conventionally used, for redistribution and intimacy of contact of the gas and liquid during their countercurrent flow, it is necessary to expose the gas to a relatively large surface of the oil by spraying the absorbent oil into the gas in the form of small droplets.

To obtain sufficient contact and absorption efficiency, the oil is resprayed in a number of stages 23 countercurrent to the flow of gas.

For this purpose there are arranged, between the upper liquid inlet 20 and upper gas outlet 18 on the one hand, and the lower liquid outlet 22 and lower gas inlet 17 on the other hand, a number of stages 23 which are designed to provide adequate contact between oil spray and gas, with no chance for any part of the gas or oil to short circuit through the washer 12 without being thoroughly mixed. In these stages, carry over of oil with the gas from stage to stage in the wrong direction is kept to a minimum. Pressure drop of the gas, in passing through the washer or scrubber 12, from the gas inlet 17 to the gas outlet 18, is kept low comparably to that favored with packed towers. The quantity of oil required to be recirculated over each stage is reasonably low to reach an equilibrium efficiency in each stage 23 approaching 100 per cent.

The oil is redispersed into the gas in each stage 23 as a fine spray by means of recirculating pumps 24 which pump the oil through conical spray heads or nozzles 25 through lines 27 and headers 26 at pressures of from 5 p. s. i. g. to 50 p. s. i. g. pressure. The recirculating pumps are provided for each stage, with a capacity for spraying a larger volume than the volume of the freshly debenzolized wash oil fed to the washer or scrubber 12 by the inlet line 20 for the oil feed to the washer 12. The pumps 24 may all be located at ground level as indicated at 24'.

Above the topmost or last stage 23 and above the conical spray heads 25 for the fresh oil feed but below the gas outlet 18, a mist eliminator 30 is disposed in the path of the gas leaving the last stage 23 and passing to the gas outlet 18.

Each stage is constituted of an unpacked lower gas spray chamber 28 and a separate upper unpacked spray de-entrainment chamber 29.

In each stage the oil is sprayed downwardly across a lower unpacked vertical gas flow spray chamber 28, and carry over oil is de-entrained or disengaged from the gas in a separate upper vertical gas flow spray de-entrainment chamber 29.

Each vertical gas flow spray chamber 28 is provided with a lower horizontal partition 31 having a multiplicity of spaced-apart vertical gas inlet passages 32 for distributing the gas over the entire horizontal cross-sectional area of its spray chamber, for redistribution of the gas in each stage during its flow through the scrubber.

These vertical passages 32, except those for the lowermost chambers 28 are provided with caps or elements 33 for deflecting spray from passing through the vertical passages 32, and the lower partitions 31 containing these inlet passages 32 form the bottoms of the spray chambers 28 as well as forming the tops of the de-entrainment chambers 29, so that said passages pass the gas from each de-entrainment chamber 29, into the bottom of each next spray chamber 28. These vertical passages 32 and their caps 33 are designed to assure uniform flow of gas with a minimum of pressure drop.

Each spray chamber 28 is also provided at its top with a horizontal partition 34 having a multiplicity of gas outlet orifices 35 for constraining or forcing all the gas to pass through the restricted orifices 35 on its way to its spray de-entrainment chamber 29. These orifices also are designed to assure uniform flow of gas with a minimum drop of pressure.

These partitions 34 form the top of the spray chambers 28 as well as the bottoms of the de-entrainment chambers 29.

In each stage 23, the spray headers 26 and spray heads or nozzles 25 for each lower gas spray chamber 28 are located within the upper de-entrainment chamber 29 for the same stage.

In accordance with the invention, the restricted outlet orifices 35 are not capped. Instead, the heads or nozzles 25 are disposed adjacent to, but in spaced relation downstream of the gas flow from, the gas outlet orifices 35 so as to direct their sprays downwardly into the gas spray chambers 28 through the gas outlet orifices 35 so as to cover said orifices with the narrowest and most intense portion of the spray entering the spray chambers 28. In this manner all of the gas from chamber 28 is forced to pass through the intense portion of the fine sprays on leaving the spray chambers 28 and before entering the spray de-entrainment chambers 29.

Both chambers 28, 29, are unobstructed to gas flow by packing or equivalent and all passages and orifices are free of solid or continuous phases of liquid as in bubble cap trays so that there is free flow of gas with a low pressure drop from stage 23 to stage 23.

Also, in accordance with the invention, to attain the aforesaid objects, the effective horizontal cross-sectional area, transversely or crosswise of the direction of flow of the gas, of each de-entrainment chamber 29, and its volumetric flow capacity, or depth, are as great as, or greater than, that of their spray de-entrainment chambers 28, so that the velocity of flow of the gas in the de-entrainment chambers 28 is as low as, or lower than, that which obtains in the spray chambers 28 before the gas passes with its acceleration in flow into and through the outlet ports or orifices 35.

Hence, the gas is de-entrained at a velocity much lower than the velocities at which the gas entrains liquid in passing through the orifices 35, as a result of the acceleration in flow of the gas in passing through the restricted orifices.

The horizontal cross-sectional area and volumetric depth of the de-entrainment chambers, of course, may be made still larger for still more efficient de-entrainment, and the disposition of the spray heads or nozzles 25 may be adjusted further inwardly to the orifices 35, and even terminate upstream of gas flow to the orifices within the contemplation of the invention when employed in conjunction with the low velocity feature of the de-entrainment step and chamber as above described.

The liquid sprayed into the respective gas spray chambers 28 is collected in these chambers in the form of a pool 36 provided with a sump or well 37 so that the liquid may be resprayed again into the gas in the same stage. For this, the pumps 24 are connected with the respective wells 37 by lines 38. The partitions 31 constitute with the walls of the shell 12 a receptacle for the purpose, and the orifices 32 are provided with risers 40 to which the caps 33 are applied to prevent the liquid in the collecting pools from by-passing the pumps 24.

Overflow of liquid from stage 23 to stage 23 is effected by means of overflow pipes 39 which discharge the excess liquid from each pool 36 of each stage 23 to the pool 36 in the spray chamber for the next stage 23 whence it commingles and ultimately is recirculated in the form of a fine spray successively throughout the respective spray chambers 28.

The liquid that settles out of the gas stream by de-entrainment in the de-entrainment chambers 29 likewise collects on the partitions 34 forming the top of the spray chambers 28, the de-entrained collected globules then pass along with the spray from heads 25 through the orifices 35 into the next lower gas spray chambers 28.

The spray chambers and the de-entrainment chambers are of constant horizontal cross-sectional area from the partitions 31 to the partitions 34 which separate them and are of equal depth and the gas flow is vertically through the same.

The effective depth of the free gas space is, in operation, advantageously greater in the de-entrainment chambers 29 than in the gas spray chambers 28, since the pool of liquid collects to a substantial depth in the gas spray chambers 28. The time of the gas in the de-entrainment space 29 is therefore longer than in the gas spray space 28. Advantageously therefore, there is little, if any, carryover of spray with the gas from stage to stage notwithstanding the greater intimacy of contact with the more intense portion of the sprays in the spray chambers and orifices 35 as a result of the gas passing at its highest velocity through the narrower and finer portion of the spray cones discharging through the gas outlet orifices 35.

In operation, benzol-laden gas enters the scrubber 12 through a lower gas inlet 17 and flows generally upwardly through pass 10, down through conduit 13 from the top of pass 10 into the bottom of pass 11, whence the gas continues its general flow upwardly through the scrubber 12 by way of pass 11 where it leaves the system freed of its benzol content through the upper gas outlet 18.

Concurrently, absorbent-oil solvent for benzol or light oil, such as straw oil, or other conventional solvent, in fresh debenzolized condition, is fed into the scrubber 12 through the upper liquid inlet 20, whence it is forced by pump 24 through the spray heads 25 generally downwardly through the pass 11, countercurrent to the up-flowing gas. From the bottom of pass 11, the liquid is forced by the lowermost pump 24 for pass 11 through line 21 into the top of pass 10, whence it continues its flow under pressure of the uppermost pump 24 for pass 10 in a generally downward direction through the scrubber 12 to the lower liquid outlet conduit 22, which delivers the benzol enriched solvent to method and apparatus, as conventional, for stripping the absorbed benzol, or light oil, from the solvent, the denuded solvent then being returned as fresh feed through line 20.

During the course of the countercurrent flow of gas and liquid, they are redistributed into contact with each other as follows:

The fresh feed from line 20, under pressure of its pump 24, is discharged downwardly from the spray heads 25 beyond the outlet orifices 35, that is, downstream as to gas flow through the orifices, so that the sprays flow through the orifices downwardly in gas spray chamber 28 with the narrower intense portion of the sprays covering the orifices 35. The spray heads 25 and orifices 35 are spaced from each other so that the wider portions of the cones overlap in chambers 28. The liquid from the sprays collect in the pool 36 for that stage 23, and is recirculated by pump 24 back to the spray heads for the same gas spray chamber from which the pump withdraws it, at a rate, preferably twice the rate, or more, than the rate at which the fresh liquid is fed in through line 20. The rate of circulation is governed by the concentration of benzol in the absorbent liquid, the liquid being recirculated until it reaches substantial equilibrium with the gas with respect to the benzol or other constituent to be removed. Excess liquid overflows through downcomers 39 to the pool 36 in the next lower gas spray chamber, whence the liquid is recirculated in the same manner, or at a greater rate, with overflow of the excess liquid to the next stage, and so on through the remainder of the stages until the liquid arrives at the lower liquid outlet 22.

The gas from the lower gas inlet 17 flows upwardly at a high velocity through the inlet distribution passages 32 into the gas spray chamber 28 at the lowermost part of pass 10 whence it flows at a lower but substantially constant velocity through the overlapping spray cones from the inlet passages 32 to the outlet orifices 35 through which the spray enters from the heads 25 which spray covers said orifices 35. All gas flows at highest velocity through the spray in the orifices 35 while the orifices 35 are covered by the narrower portion of the sprays of greatest intensity from heads 25, and out into the spray de-entrainment chamber 29 thereabove, whence the gas flows with a sudden drop in gas velocity at a rate as low as, or lower than, the velocity the gas flowed through the spray in chamber 28 and before its acceleration in flow through the restricted orifices 35. The gas continues to flow in chamber 29 at this lower velocity at a constant and uniform rate from the outlet orifices 35 to the inlet passages 32 for the gas spray chamber 28 of the next stage 23 above. The spray entrained by the gas in passing through the gas spray chamber 28 and its outlet orifices 35 loses its velocity or momentum, which sustained it in suspension, by the drop in velocity of the gas in chamber 29, and en-trained spray drops out of, or settles through, the gas current down to the top of the partitions 34, whence it flows through the outlet orifices 35 and returns to the chamber 28 in which it was en-trained in commingled relation with the spray from the heads 25.

From the lowermost spray de-entrainment chamber 29, the gas continues on in the same manner through each of the next succeeding stages 23, serially upwardly through the passes 10, 11, until the gas discharges from the upper gas outlet 18 freed of the benzol or other constituent to be removed.

As an example of the high velocities at which the gas is treated with the attainment of substantially equilibrium conditions in respective stages 23, the gas velocity successfully employed has been, and is, 3 to 5 feet per second through the divergent cones of sprays in the gas spray chambers 28, and a velocity of 12 to 20 feet per second, through the gas outlet port 35 when fully covered with inflowing spray, with the velocity of flow in the spray de-entrainment chambers 29 no greater than that which obtains in the gas spray chambers 28, and with high pressure sprays of 5 to 50 pounds per square inch.

Referring to the embodiment illustrated in Figures 3 to 6, the scrubber as there shown is of the more conventional single pass type but rectangular in horizontal cross-section, instead of cylindrical, or oval or elliptical.

The same reference numerals will be used in Figs. 3 to 6 to indicate the same parts as those described in connection with the description of Figures 1 and 2.

The scrubber 12 comprises a single pass 10, in which the gas flow is horizontal in each chamber rather than vertical, and the headers 26 are disposed along the outside of the shell 12, for more ready access to the valves, etc.

The gas flow is alternately in opposite directions in adjacent chambers, the gas flow being in the same direction in each gas spray chamber 28 and likewise being in the same but in the opposite direction in all of the spray de-entrainment chambers 29.

Hence, the gas flow is zig-zag throughout the tower 12 in opposite directions in adjacent chambers 28, 29.

Benzol-laden gas to be debenzolized or scrubbed to strip it of its benzol content is admitted to the lowermost portion 16 of the pass 10 by means of lower gas inlet 17 and after flowing upwardly through the pass 10, finally flows out through the upper gas outlet 18 substantially free of the content of benzol to be removed from the gas by means of an absorbent oil or solvent for benzol, or light oil, such as straw oil.

The liquid absorbent solvent is first introduced by means of line 20 into contact with the gas as fresh debenzolized absorbent liquid at the top 19 of the pass 10 whence it is made to flow countercurrently to the flow of the gas, in a generally downward direction through the pass 10, until it reaches the bottom 16 of the pass 10 enriched in benzol absorbed from the gas.

The benzol-enriched absorbent leaves the scrubber 12 through lower liquid outlet 22 at the bottom 16 below the gas inlet 17 where the gas first enters the scrubber.

To obtain sufficient contact and absorption efficiency, for absorbing the benzol, or light oil from the gas, such as coke oven gas, with intimate contact of the gas and liquid during their countercurrent flow through pass 10, by means of fine sprays of liquid, in the absence of packing as heretofore conventionally used for the redistribution and intimacy of contact of the gas and liquid, it is necessary to expose the gas to a relatively large surface of the oil by spraying the oil into the gas in the form of small droplets.

For this purpose there are arranged in the embodiment of the invention illustrated in Figs. 3 to 6, between the upper liquid inlet 20 and upper gas outlet 18 on the one hand, and the lower liquid outlet 22 and the lower gas inlet 17 on the other hand, a number of stages 23 which are also designed to provide adequate contact between oil spray and gas, with no chance for any part of the gas or oil to short circuit through the washer 12 without being thoroughly mixed. In these stages, carryover of oil with the gas from stage 23 to stage 23 in the wrong direction is kept to a minimum. Pressure drop of the gas, in passing through the washer or scrubber 12, from gas inlet 17 to gas outlet 18, is kept low comparably to that favored with packed towers. The quantity of oil required to be recirculated over each stage is reasonably low to reach an equilibrium efficiency in each stage 23 approaching 100 per cent.

In the next preferred embodiment, the fresh oil fed to the first or topmost stage 23 by the line 20 may or may not be recirculated over that stage 23, to provide for a final cleanup of last traces of benzol from the gas before it flows out through gas outlet 18. When it is not recirculated, a blanked-off connection (not shown) to line 27 is provided, in case it should be desired to later provide for recirculation in this stage, and the oil from the first stage is then passed to the next lower stage.

The fresh oil is initially dispersed in the topmost stage, and re-dispersed into the gas in each stage 23, as a fine spray by means of recirculating pumps 24 which pump the oil through conical spray heads or nozzles 25 through lines 27 and headers 26 at pressures of from 5 p. s. i. g. to 50 p. s. i. g. pressure.

As in the embodiment of Figs. 1 and 2, the recirculating pumps 24 are provided for each stage 23, with a capacity for spraying a larger volume than the volume of the freshly debenzolized wash oil fed to the washer 12 by line 20. The pumps 24 may all be located at ground level as indicated at 24'.

Above the topmost or last stage 23, and above the conical spray heads 25 for the fresh oil feed from line 20, but below the gas outlet 18, a mist eliminator 30 is disposed in the path of the gas leaving the last stage 23 and passing to the gas outlet 18.

Each stage is constituted of an unpacked lower gas spray chamber 28 and a separate upper unpacked spray de-entrainment chamber 29.

In each stage the oil is sprayed horizontally across a lower unpacked spray chamber 28, and carryover oil is de-entrained or disengaged from the gas in the separate upper horizontal gasflow spray de-entrainment chamber 29.

Each horizontal gas spray chamber 28 is provided at one end with a vertical partition 31 having a multiplicity of spaced-apart horizontal inlet passages 32 for distributing the gas horizontally over the entire vertical cross-sectional area of its spray chamber, for redistribution of the gas in each stage during its flow through the scrubber.

These horizontal passages 32 are provided with baffles in the form of adjustable louvres 33 for deflecting spray from passing through the horizontal passages 32. Each chamber 28 also has a lower partition 41 which forms the bottom of the spray chamber 28 as well as forming the top of the de-entrainment chamber 29 therebelow. These horizontal passages 32 and their horizontal baffles 33 are designed to assure uniform flow of gas with a minimum of pressure drop.

Each gas spray chamber 28 is also provided at its end opposite the end having the partition 31 with a vertical partition 34 having a multiplicity of gas outlet orifices 35, disposed over the entire vertical cross-sectional area of chambers 28, for constraining or forcing all the gas to pass horizontally through the restricting orifices 35 on its way to its spray de-entrainment chamber 29. These orifices also are designed to assure uniform flow of gas with a minimum pressure drop.

Each gas spray chamber 28 also has an upper partition 42 which forms the top of the spray chamber 28 as well as the bottom of its de-entrainment chamber 29 above.

In each stage 23, the spray headers 26 and valves for each lower gas spray chamber 28 are located alongside the same outside the shell 12.

The partitions 31 with the inlet passages 32 are located in spaced relation with the inside of the shell 12 at one rectangular side thereof and extend from the bottom of the chambers 28 to the top thereof and from one side 43 to the other side 44 of the shell 12 at the two sides of the chambers 28.

The space thus left constitutes vertical gas inlet risers 45 which are open below to the de-entrainment chamber 29 of the next stage 23 below, for passage of de-entrained gas from the latter to the distributing passages 32 for the chambers 28 above.

The partitions 34 with the outlet orifices 35 are each likewise located in spaced relation with the inside of the shell 12 at the rectangular side thereof opposite the side at which the partitions 31 are spaced from, and extend from the bottom of the chambers 28 to the top thereof and from one side to the other of the shell 12 at the two sides 43, 44, of the chamber 28. The space thus left constitutes vertical gas outlet risers 46 open above to the de-entrainment chamber 29 next above for the respective gas spray chambers 28, for passage of gas to be de-entrained from the respective spray chambers 28 to the de-entrainment chambers 29.

A well 37 is provided at the bottom of the gas outlet risers 46 with which the pump lines 38 are connected.

In accordance with the invention, the restricted outlet orifices 35 are not capped. Instead, the heads or nozzles 25 are disposed in the gas outlet risers 46 adjacent to, but in spaced relation downstream of the gas flow from the gas outlet orifices 35 so as to direct their sprays into the gas spray chambers 28 horizontally through the gas outlet orifices 35, throughout the vertical cross-sectional area of chambers 28, so as to cover said orifices with the narrowest and most intense portion of the spray entering the spray chambers 28. In this manner all of the gas from chambers 28 is forced to pass through the intense portion of the fine sprays on leaving the spray chambers 28 and before entering the spray de-entrainment chambers 29.

Both chambers 28, 29 are unpacked chambers, that is, they are unobstructed to gas flow by packing or equivalent and all passages and orifices are free of solid or continuous phases of liquid as in bubble cap trays so that there is free flow of gas with a low pressure drop from stage 23 to stage 23.

Also, in accordance with this embodiment of the invention, to attain the aforesaid objects, the effective vertical cross-sectional area, transversely or crosswise of the horizontal direction of flow of the gas, of each de-entrainment chamber 29, and its volumetric flow capacity, or depth, are as great as, or greater than, that of their spray de-entrainment chambers 28, so that the velocity of flow of the gas in the de-entrainment chambers 28 is as low as, or lower than, that which obtains in the spray chambers 28 before the gas passes with its acceleration in flow into and through the outlet ports or orifices 35.

Hence, the gas is de-entrained at a velocity much lower than the velocities at which the gas entrains liquid in passing through the orifices 35, as a result of the acceleration in flow of the gas in passing through the restricted orifices.

The vertical cross-sectional area and horizontal volumetric depth of the de-entrainment chambers, of course, may be made still larger for still more efficient de-entrainment, and the disposition of the spray heads or nozzles 25 may be adjusted further inwardly to the orifices 35, and even terminate upstream of the gas flow to the orifices within the contemplation of the invention when employed in conjunction with the low velocity feature of the de-entrainment step and chamber as above described.

The liquid sprayed into the respective gas spray chambers 28 is collected in these chambers in the form of a pool 36 provided with the sump or well 37 so that the liquid may be re-sprayed again into the gas in the same stage. For this, the pumps 24 are connected with the respective wells 37 by lines 38. The partitions 31 constitute with the walls of the shell 12 and the lower partitions 41 a receptacle for the pool 36.

Overflow of liquid from stage 23 to stage 23 is effected by means of overflow weirs 39 which discharge the excess liquid from each pool 36 of each stage 23, as shown in Fig. 4, through the gas inlet risers 45 to the floor of de-entrainment chambers 28 over which the liquid drains down through the gas outlet risers 46 for the next stage 23 below, whence it commingles in well 37 and ultimately is recirculated in the form of a fine spray successively throughout the respective spray chambers 28.

The liquid that settles out of the gas stream by de-entrainment in the de-entrainment chambers 29 likewise collects on the imperforate floor partitions 42 which form the tops of the spray chambers 28, the de-entrained collected globules then pass, along with the overflow liquid from the weirs 39 of the spray chamber above, into the well 37 of spray chambers 28 from which the entrained liquid was carried over.

The spray chambers and the de-entrainment chambers are of constant vertical cross-sectional area from the partitions 31 to the partitions 34, may be of equal depth, and the gas flow is constant and uniform through each of them, although as shown, the chambers 29 are of greater depth.

The effective depth or free gas space is, in operation, advantageously greater in the de-entrainment chambers 29 than the effective free gas space in the gas spray chambers 28, due to the gas risers, and also since the pool 36 of liquid collects to a substantial depth in the gas spray chambers 28 thus decreasing its effective free gas space volumetric area. A lower gas flow velocity thus obtains in the unpacked de-entrainment chamber 29 than obtains in the gas spray chambers 28, and consequently the flow velocity of the gas is well below that velocity in which entrained spray may remain in the gas stream leaving the de-entrainment chambers, as a result of flow through spray in orifices 35. Advantageously, therefore, there is little, if any, carryover of spray with the gas from stage 23 to stage 23, notwithstanding the greater intimacy of contact with the more intense portion of the sprays in the spray chambers and orifices 35 as a result of the gas passing at its highest velocity through the narrower and finer portion of the spray cones discharging through the gas outlet orifices 35.

In operation, benzol-laden gas enters the scrubber 12 through lower gas inlet 17 and flows generally upwardly through pass 10 to the top 19 where it leaves the system through the upper gas outlet 18 freed of its benzol content.

Concurrently, absorbent oil solvent, such as straw oil, for benzol or light oil, or other conventional solvent, in fresh debenzolized condition, is fed into the scrubber 12 through the upper liquid inlet 20, whence it is forced through the spray heads 25 generally downwardly through the pass 11, countercurrent to the upflowing gas, until the liquid arrives at the lower liquid outlet conduit 22, which delivers the benzol enriched solvent to method and apparatus, as conventional, for stripping the absorbed benzol, or light oil, from the solvent, the denuded solvent then being returned as fresh feed through line 20.

During the course of the countercurrent flow of gas and liquid, they are redistributed into contact with each other as follows:

The fresh feed from line 20, under pressure of pump 24, is discharged horizontally into the topmost spray chamber 28 from the spray heads 25 beyond the outlet orifices 35, that is downstream as to gas flow through the orifices, so that the sprays flow through the orifices horizontally into gas spray chamber 28 with the narrower intense portion of the sprays covering the orifices 35. The spray heads 25 and orifices 35 are spaced from each other so that the wider portions of the cones overlap in chambers 28. The liquid from the sprays collects in the pool 36. From here the liquid is recirculated by pump 24 to the spray heads for that chamber, and excess liquid overflows weir 39 to the next de-entrainment chamber and thence to the wall 37. In the topmost chamber and for all lower stages the pumps 24 pump the liquor at a higher rate, than the rate at which the freh liquid is fed in through line 20. The rate of circulation in each stage 23 is governed by the concentration of benzol in the absorbent liquid, the liquid being recirculated until it approaches substantial equilibrium with the gas with respect to the benzol or other constituent to be removed. Excess liquid that overflows each weir 39 to the pool 36 in the next lower gas spray chamber is recirculated in the same manner, or at a greater rate, with overflow at weirs 39 of the excess liquid to the next stage, and so on through the remainder of the stages until the liquid arrives at the lower liquid outlet 22.

The gas from the lower gas inlet 17 flows horizontally at a high velocity through the inlet distribution passages 32 into the gas spray chamber 28 at the lowermost part of pass 10 whence it flows at a lower but substantially constant velocity through the overlapping spray cones from the inlet passages 32 to the outlet orifices 35 through which the spray enters from the heads 25 which spray covers said orifices 35. All gas flows at highest velocity through the spray in the orifices 35 while the orifices 35 are covered by the narrower portion of the sprays of greatest intensity from conical heads 25, and out into the gas outlet risers 46 leading to spray de-entrainment chamber 29 thereabove, whence the gas flows with a sudden drop in gas velocity at a rate as low as, or lower than, the velocity the gas flowed through the spray in chamber 28 and before its acceleration in flow through the restricted orifices 35. The gas continues to flow in chamber 29 at this lower velocity at a constant and uniform rate to the gas distribution inlet risers 45 which discharge the gas through passages 32 for the gas spray chamber 28 of the next stage 23 above. The spray entrained by the gas in passing through the gas spray chamber 28 and its outlet orifices 35 loses its velocity or momentum, which sustained it in suspension, by the drop in velocity of the gas in chamber 29, and entrained spray drops out of, or settles through, the gas current down to the floor of chamber 29 formed by the partitions 42, whence the liquid flows through the gas outlet risers 46 to the well 37 below the outlet orifices 35 and is returned to the chamber 28 in which it was entrained by pump 24, in commingled relation with the liquid in pool 36, as spray through the heads 25.

From the lowermost spray de-entrainment chamber 29, the gas continues on in the same horizontal manner through each of the next higher succeeding horizontal gas flow stages 23, serially upwardly through the pass 10 until the gas discharges from the upper gas outlet 18 freed of the benzol or other constituent to be removed.

As an example of the high velocities at which the gas is treated with the attainment of substantially equilibrium conditions in respective stages 23, the gas velocity that may be successfully employed are 3 to 5 feet per second through the divergent cones of sprays in the horizontal gas spray chambers 28, and a velocity of 12 to 20 feet per second through the gas outlet ports 35 when fully covered with inflowing spray, with the velocity of horizontal flow in the horizontal gas flow spray de-entrainment chambers 29 no greater than that which obtains in the horizontal gas flow gas spray chamber 28, and with high pressure sprays of 5 to 50 pounds per square inch.

In both embodiments of the invention, Figs. 1, 2, and Figs 3 to 6, the gas on entering the spray chambers first meets the spray where the globules are more widely dispersed from each other and are bigger globules than in the regions of the cones of the spray progressively closer to the spray heads.

This is a result of the gas flow in opposite direction to the spray which slows up the flow of the globules nearer the more remote regions from the pressure spray heads, so that the finer globules unite into bigger ones.

From the foregoing it will be noted that the oil is sprayed horizontally across each stage through a series of holes in the gas exit riser. The gas enters each stage through an inlet riser at the side opposite the sprays, which inlet riser is provided with baffled, louvre type openings, for distributing the gas. The gas flows uniformly across the unpacked space between the inlet and outlet risers, directly through the oil spray, all gas leaving the stage through the same openings through which the oil enters, and then all the gas flows horizontally in the opposite direction in each unpacked space above each contact space in each stage, for gravitational disengagement of entrained oil droplets from the gas, which disengagement spaces are designed to minimize the carryover of oil in the wrong direction.

The oil spray headers and valves are located at the level of each stage along the outside of the shell and are easily accessible for checking and cleaning from the outside of the shell. The motors and pumps may be at ground level where they are more conveniently accessible.

In both embodiments, manholes are provided in the shell wall for each stage to allow access to the interior for adjustment, cleaning and repair of the parts in the interior of the shell.

The separation of the spray and de-entrainment zones into separate chambers provides a better control of the gas and liquid for re-distribution individualized to the respective equilibrium stages, thus providing for superior absorption with a closer approach to equilibrium conditions between the gas and liquid as they leave the respective stages.

The invention as hereinabove set forth is embodied

I claim:

1. Apparatus for gas and liquid contact in unpacked stages with counterflow of gas and liquid from stage to stage and counterflow of the gas with the liquid in the form of a fine spray through unobstructed gas space in each stage, comprising: a scrubbing tower having a lower gas inlet and upper gas outlet; a plurality of stages arranged one above the other in the tower for flow of gas serially through the stages from the lower gas inlet to the upper gas outlet with each stage comprising a separate unpacked unobstructed lower spray chamber and separate unpacked unobstructed upper spray de-entrainment chamber; means including conical spray heads for spraying liquid into each spray chamber countercurrent to the flow of gas therethrough; means for introducing fresh liquid to the tower through the spray heads for the spray chamber of the uppermost stage; means for overflow of liquid from each spray chamber to the spray chamber next below; and means for recirculating liquid from each spray chamber back to the spray heads for the respective spray chambers; wherein each unpacked and unobstructed spray chamber of each stage is provided with an inlet partition having distributing inlet passages for distribution of the entering gas over the entire cross-sectional area of the unobstructed chamber, and an outlet partition having restricted outlet orifices for constraining all gas to flow out through the orifices on its way to the unpacked and unobstructed de-entrainment chamber for the unpacked and unobstructed spray chamber of the same stage; each unpacked spray chamber being devoid of obstructions to gas flow from its inlet partition to its outlet partition, and each unpacked de-entrainment chamber being devoid of obstructions to gas flow from the outlet partition of the spray chamber below its stage to the inlet partition of the spray chamber of the next stage above, and the said inlet passages and outlet orifices being devoid of solid and continuous phases of liquid; the conical spray heads for each unpacked unobstructed stage are located downstream of the gas flow through the orifices and disposed closely thereto to discharge the spray into the unpacked unobstructed spray chamber countercurrently through the orifices so as to cover the orifices with the narrower and most intense portion of the conical spray while the gas is flowing out countercurrently therethrough on its way to the unpacked spray de-entrainment chamber of each stage, and the unpacked unobstructed spray de-entrainment chamber of each stage is of an effective cross-sectional area crosswise of the line of flow of gas therethrough and of a volumetric capacity and depth, at least as great as that of the unpacked unobstructed spray chamber of its stage, so that the velocity of flow of gas in de-entrainment is as low as, or lower than, that which obtains before the gas passes with its acceleration in flow through the intense portion of the spray in the outlet orifices.

2. Apparatus for gas and liquid contact in unpacked stages with counterflow of gas and liquid from stage to stage and counterflow of the gas with the liquid in the form of a fine spray through unobstructed gas space in each stage, comprising: a scrubbing tower having a lower gas inlet and upper gas outlet; a plurality of stages arranged one above the other in the tower for flow of gas serially through the stages from the lower gas inlet to the upper gas outlet with each stage comprising a separate unpacked unobstructed lower spray chamber and separate unpacked unobstructed upper spray de-entrainment chamber; means including spray heads for spraying liquid into each spray chamber countercurrent to the flow of gas therethrough; means for introducing fresh liquid to the tower through the spray heads for the spray chamber of the uppermost stage; means for overflow of liquid from each spray chamber to the spray chamber next below; and means for recirculating liquid from each spray chamber back to the spray heads for the respective spray chambers; wherein each unpacked and unobstructed spray chamber of each stage is provided with an inlet partition having distributing inlet passages for distribution of the entering gas over the entire cross-sectional area of the unobstructed chamber, and an outlet partition having restricted outlet orifices for constraining all gas to flow out through the orifices on its way to the unpacked and unobstructed de-entrainment chamber for the unpacked and unobstructed spray chamber of the same stage; each unpacked spray chamber being devoid of obstructions to gas flow from its inlet partition to its outlet partition, and each unpacked de-entrainment chamber being devoid of obstructions to gas flow from the outlet partition of the spray chamber below of its stage to the inlet partition of the spray chamber of the next stage above, and the said inlet passages and outlet orifices being devoid of solid and continuous phases of liquid; the spray heads for each unpacked unobstructed stage are located downstream of the gas flow through the orifices and disposed closely thereto to discharge the spray into the unpacked unobstructed spray chamber countercurrently through the orifices so as to cover the orifices with the narrower and most intense portion of the spray while the gas is flowing out countercurrently therethrough on its way to the unpacked spray de-entrainment chamber of each stage, and the unpacked unobstructed spray de-entrainment chamber of each stage is of an effective cross-sectional area crosswise of the line of flow of gas therethrough and of a volumetric capacity and depth, at least as great as that of the unpacked unobstructed spray chamber of its stage, so that the velocity of flow of gas in de-entrainment is as low as, or lower than, that which obtains before the gas passes with its acceleration in flow through the intense portion of the spray in the outlet orifices.

3. Apparatus as claimed in claim 2, and in which the spray chambers are each of constant cross-sectional area from their partitions having the inlet passages to their partitions having the gas outlet orifices, and in which the spray de-entrainment chambers are likewise each of constant cross-sectional area from the region of the partitions having gas outlet orifices of their spray chambers below to the region of the partitions having inlet orifices of the next spray chamber above.

4. Apparatus as claimed in claim 2, and in which the spray chambers and spray de-entrainment chambers of each stage comprise vertical flow chambers, with the partitions having inlet passages for each spray chamber comprising horizontal partitions forming the bottom of its spray chamber and the top of the spray de-entrainment chamber of a stage below, and the partitions having gas outlet orifices for each spray chamber comprising horizontal partitions forming the top of its spray chamber and the bottom of its spray de-entrainment chamber above, and the spray heads and headers therefor of the respective stages are located within the de-entrainment chambers and have their nozzle heads set to discharge the liquid downwardly in the form of a spray into the spray chamber below through the gas outlet orifices in the partition so as to cover the outlet orifices with the sprays of liquid as the gas flows countercurrently through the same.

5. Apparatus as claimed in claim 2, and in which the spray chambers and spray de-entrainment chambers of each stage comprise horizontal gas flow chambers with the partitions having inlet passages for each spray chamber disposed vertically at one end of the same alongside the inside of the shell of the tower and the partitions with gas outlet orifices disposed vertically at the opposite end of the same alongside the inside of the shell diametrically opposite the inlet passage partition, inlet gas risers between each inlet partition and the shell and open below to the de-entrainment chamber below, outlet gas risers between each outlet partition and the shell and open above to the de-entrainment chamber above, whereby the gas flow is in the same direction in each spray chamber, and in the opposite direction in each de-entrainment chamber, horizontally alternately in opposite direction in adjacent chambers in a zig zag manner from the bottom to the top of all stages in the tower and from one side of a diameter of the shell to the opposite side of the diameter of the shell; the spray heads for each spray chamber being disposed in the gas outlet risers with their nozzles set to discharge into the gas outlet passages so as to cover the same during counterflow of gas therethrough, and having connections with a header along the outside of the shell at the level of the different stages for feed of liquid to the stages in a manner accessible from the exterior of the shell.

6. Apparatus as claimed in claim 5, and in which: the adjacent chambers are separated from each other by horizontal partitions respectively constituting the floors of the spray chambers and the de-entrainment chambers; the partitions having inlet passages and gas outlet orifices extend upwardly from the bottom floor of the spray chambers to the partition forming the floor of the de-entrainment chamber above and extend crosswise of the spray chamber from one side to the opposite side of the inside of the tower shell, the inlet passages comprise a series of horizontal passages arranged one above the other crosswise of the spray chamber and having adjustable louvres therefor for preventing spray from the headers passing through the inlet passages; a weir beneath the inlet partition in each spray chamber for overflow of liquid therefrom through its gas riser to the de-entrainment floor below for passage therefrom to the gas outlet riser for the spray chamber next below, and each said gas outlet riser comprising a well receiving liquid from the floor of its spray chamber and discharging to the means for recirculating spray liquid to the spray head for that spray chamber.

7. Apparatus for gas and liquid contact in unpacked stages with counterflow of gas and liquid from stage to stage and counterflow of the gas with the liquid in the form of a fine spray through unobstructed gas space in each stage, comprising: a scrubbing tower having a lower gas inlet and upper gas outlet; a plurality of stages arranged one above the other in the tower for flow of gas serially through the stages from the lower gas inlet to the upper gas outlet with each stage comprising a separate unpacked unobstructed lower spray chamber and separate unpacked unobstructed upper spray de-entrainment chamber; means including spray heads for spraying liquid into each spray chamber countercurrent to the flow of gas therethrough; means for introducing fresh liquid to the tower through the spray heads for the spray chamber of the uppermost stage; means for overflow of liquid from each spray chamber to the spray chamber next below; and means for recirculating liquid from each spray chamber back to the spray heads for the respective spray chambers; wherein each unpacked and unobstructed spray chamber of each stage is provided with an inlet partition having distributing inlet passages for distribution of the entering gas over the entire cross-sectional area of the unobstructed chamber, and an outlet partition having restricted outlet orifices for constraining all gas to flow out through the orifices on its way to the unpacked and unobstructed de-entrainment chamber for the unpacked and unobstructed spray chamber of the same stage; each unpacked spray chamber being devoid of obstructions to gas flow from its inlet partition to its outlet partition, and each unpacked de-entrainment chamber being devoid of obstructions to gas flow from the outlet partition of the spray chamber below of its stage to the inlet partition of the spray chamber of the next stage above, and the said inlet passages and outlet orifices being devoid of solid and continuous phases of liquid; the spray heads for each unpacked unobstructed stage are located downstream of the gas flow through the orifices and disposed closely thereto to discharge the spray into the unpacked unobstructed spray chamber countercurrently through the orifices so as to cover the orifices with the narrower and most intense portion of the spray while the gas is flowing out countercurrently therethrough on its way to the unpacked spray de-entrainment chamber of each stage; whereby all the gas passes with an acceleration in flow through the intense portion of the spray in the outlet orifices.

8. Apparatus for gas and liquid contact in unpacked stages with counterflow of gas and liquid from stage to stage and counterflow of the gas with the liquid in the form of a fine spray through unobstructed gas space in each stage, comprising: a scrubbing tower having a lower gas inlet and upper gas outlet; a plurality of stages arranged one above the other in the tower for flow of gas serially through the stages from the lower gas inlet to the upper gas outlet with each stage comprising a separate unpacked unobstructed lower spray chamber and separate unpacked unobstructed upper spray de-entrainment chamber; means including spray heads for spraying liquid into each spray chamber countercurrent to the flow of gas therethrough; means for introducing fresh liquid to the tower through the spray heads for the spray chamber of the uppermost stage; means for overflow of liquid from each spray chamber to the spray chamber next below; and means for recirculating liquid from each spray chamber back to the spray heads for the respective spray chambers; wherein each unpacked and unobstructed spray chamber of each stage is provided with an inlet partition having distributing inlet passages for distribution of the entering gas over the entire cross-sectional area of the unobstructed chamber, and an outlet partition having restricted outlet orifices for constraining all gas to flow out through the orifices on its way to the unpacked and unobstructed de-entrainment chamber for the unpacked and unobstructed spray chamber of the same stage; each unpacked spray chamber being devoid of obstructions to gas flow from its inlet partition to its outlet partition, and each unpacked de-entrainment chamber being devoid of obstructions to gas flow from the outlet partition of the spray chamber below of its stage to the inlet partition of the spray chamber of the next stage above, and the said inlet passages and outlet orifices being devoid of solid and continuous phases of liquid; the spray heads for each unpacked unobstructed stage are located adjacent the gas outlet orifices and disposed to discharge the spray into the unpacked unobstructed spray chamber countercurrently in the region of the orifices so that all the gas is constrained to pass through the narrower and most intense portion of the spray while the gas is flowing out countercurrently through the gas outlet orifices on its way to the unpacked spray de-entrainment chamber of each stage, and the unpacked unobstructed spray de-entrainment chamber of each stage is of an effective cross-sectional area crosswise of the line of flow of gas therethrough and of a volumetric capacity and depth, at least as great as that of the unpacked unobstructed spray chamber of its stage, so that the velocity of flow of gas in de-entrainment is as low as, or lower than, that which obtains before the gas passes with its acceleration in flow through the intense portion of the spray in the region of the gas outlet orifices.

References Cited in the file of this patent

UNITED STATES PATENTS

| | | |
|---|---|---|
| 1,722,466 | Hayes | July 30, 1929 |
| 1,985,010 | Berkhuijsen | Dec. 18, 1934 |
| 2,070,578 | Bowman | Feb. 16, 1937 |
| 2,088,817 | Shoeld | Aug. 3, 1937 |
| 2,315,481 | Drewry et al. | Mar. 30, 1943 |
| 2,523,441 | McKamy | Sept. 26, 1950 |